(12) United States Patent
Chevrette

(10) Patent No.: US 8,089,168 B2
(45) Date of Patent: Jan. 3, 2012

(54) TIRE ACTUATED GENERATOR FOR USE ON CARS

(76) Inventor: Claude Chevrette, Laval (CA)

( * ) Notice: Subject to any disclaimer, the term of this patent is extended or adjusted under 35 U.S.C. 154(b) by 520 days.

(21) Appl. No.: 12/327,803

(22) Filed: Dec. 3, 2008

(65) Prior Publication Data
US 2009/0256450 A1 Oct. 15, 2009

Related U.S. Application Data

(60) Provisional application No. 61/045,002, filed on Apr. 15, 2008.

(51) Int. Cl.
F03G 7/08 (2006.01)
H02K 7/18 (2006.01)

(52) U.S. Cl. .......................................................... 290/1 R

(58) Field of Classification Search ................... 290/54; 60/325; 180/2.1, 2.2, 53.61, 65.7, 65.6, 65.23, 180/65.51, 65.225, 65.235, 65.285; 417/229
See application file for complete search history.

(56) References Cited

U.S. PATENT DOCUMENTS

| | | | |
|---|---|---|---|
| 4,095,665 A | 6/1978 | Armfield | |
| 4,477,764 A | 10/1984 | Pollard | |
| 5,704,440 A * | 1/1998 | Urban et al. | 180/65.23 |
| 6,334,498 B1 | 1/2002 | Morisawa | |
| 6,502,842 B2 | 1/2003 | Ko | |
| 6,768,273 B2 | 7/2004 | Uno | |
| 7,145,256 B2 * | 12/2006 | Koharcheck et al. | 290/1 R |
| 7,279,799 B1 * | 10/2007 | McCauley | 290/1 R |
| 2002/0153178 A1 * | 10/2002 | Limonius | 180/2.2 |
| 2009/0194998 A1 * | 8/2009 | Lin | 290/1 R |

* cited by examiner

Primary Examiner — Tulsidas C Patel
Assistant Examiner — Stefan Mikailoff

(57) ABSTRACT

A tire actuated generator for use on a car has a pair of wheels making contact with the rear tire. One wheel from the pair of wheels is at the leading side of the tire. One wheel from the pair of wheels is at the trailing side of the tire. Each of the wheels is directly connected to a generator. In a preferred embodiment, each of the wheels are also frictionally coupled to an other wheel, the other wheel being connected to a generator.

15 Claims, 3 Drawing Sheets

TIRE ACTUATED GENERATOR FOR USE ON CARS

This application claims priority based on provisional application 61/045002 filed Apr. 15, 2008.

FIELD OF THE INVENTION

The present invention relates generally to generators but more particularly to generators actuated by car tires.

BACKGROUND OF THE INVENTION

There are many devices in use on cars to recuperate electricity such as U.S. Pat. No. 4,477,764 wherein an energy generating and storage system for an electric vehicle is adapted to generate and recharge the principal electric storage battery to recover substantial energy losses occurring during normal operation of the vehicle.

U.S. Pat. No. 6,334,498 describes a hybrid vehicle having an engine and a motor to be controlled independently of each other for running the vehicle. The vehicle is given a braking demand detecting function to detect a braking demand through an idle ON of the engine while the vehicle is running, and a first braking function to suppress the rise in the vehicle speed of the vehicle by a regenerative braking force of the motor if the braking demand is detected by the braking demand detecting function.

There are also bicycles using the turning wheel in order to actuate a dynamo such as U.S. Pat. No. 6,502,842 wherein a power generating device includes a dynamo, a rack mounted on the frame of a bicycle to hold the dynamo, and a wheel attached to the rack. When the device is engaged, the wheel contacts the ground and rotates to drive the dynamo while the bicycle is in motion.

U.S. Pat. No. 6,768,273 is also directed at bicycles and discloses a bicycle charge control circuit for receiving electric power from a bicycle dynamo and for controlling the operation of a lamp and a charging circuit includes a lamp switch for selectively providing power from the dynamo to the lamp, a battery charged by the dynamo, and a lamp control circuit operatively coupled to the first lamp switch and to the battery to control the first lamp switch to intermittently supply power to the lamp when the battery voltage is below a selected value.

The prior art does not disclose a simple yet efficient system that can be adapted to a variety of vehicles and produce supplementary electricity.

SUMMARY OF THE INVENTION

In view of the foregoing disadvantages inherent in the known devices now present in the prior art, the present invention, which will be described subsequently in greater detail, is to provide objects and advantages which are to provide for a wheel actuated generator.

To attain these ends, the present invention generally comprises a pair of wheels making contact with the rear tire. One wheel from the pair of wheels is at the leading side of the tire. One wheel from the pair of wheels is at the trailing side of the tire. Each of the wheels is directly connected to a generator.

In a preferred embodiment, each of the wheels are also frictionally coupled to an other wheel, the other wheel being connected to a generator.

Preferably, a bracket connects the wheels to the car's frame in a removable manner (e.g., with bolts as shown in FIGS. 1-3), and a spring with a chosen spring tension keeps pressure on the wheels so that they always make contact with the tire as it moves up and down by movement of the suspension.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

DETAILED DESCRIPTION

Figure 1:
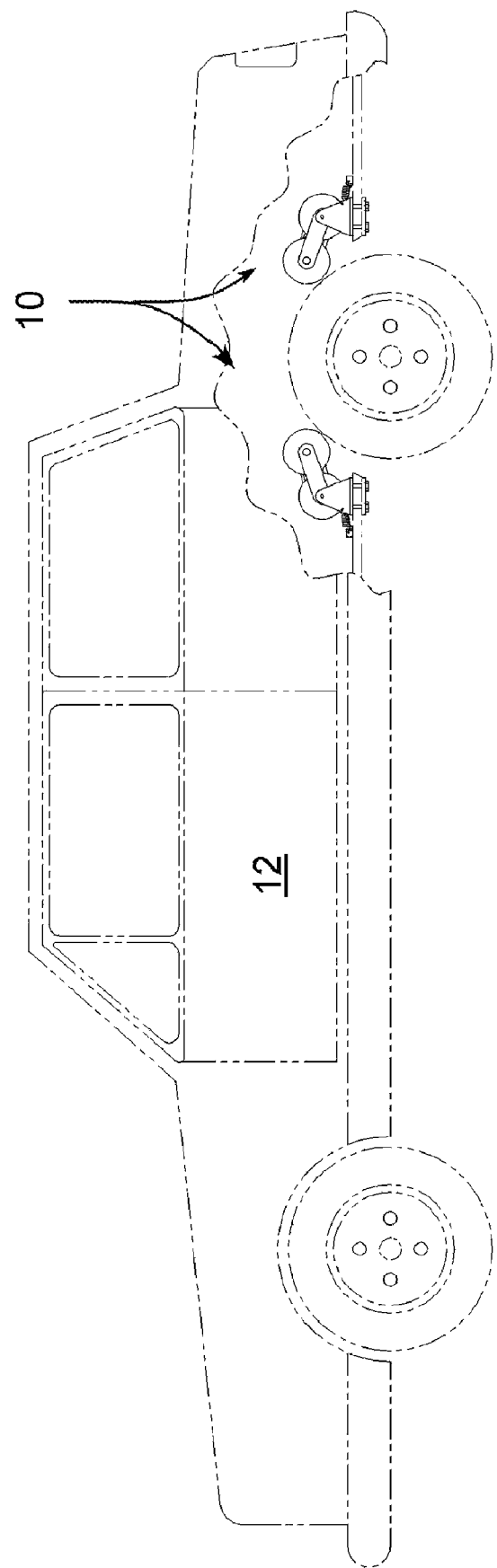
FIG. 1 Side view of the invention in context.
Figure 2:
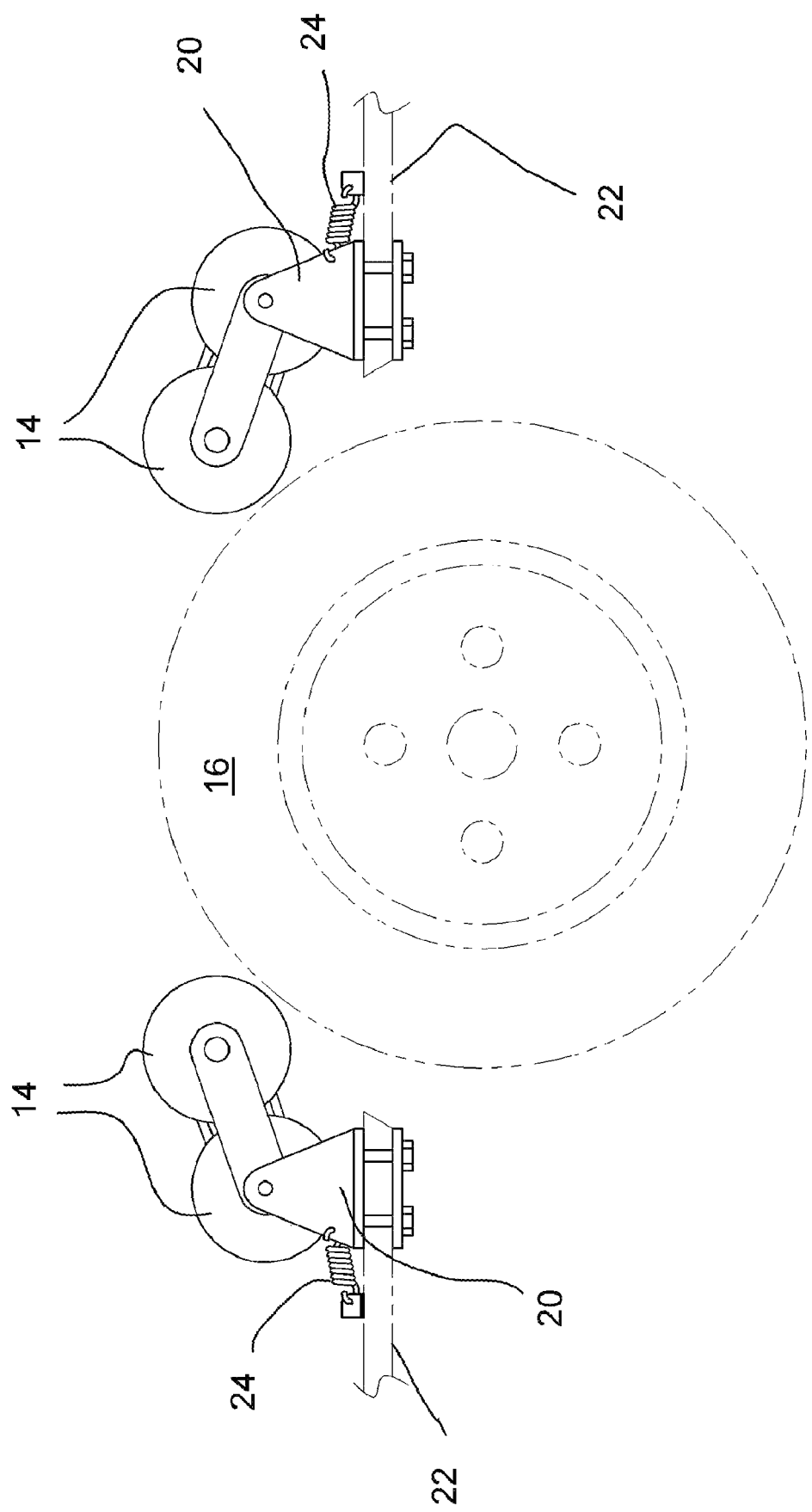
FIG. 2 Side view of the invention
FIG. 3 Top view of the invention.
Figure 3:
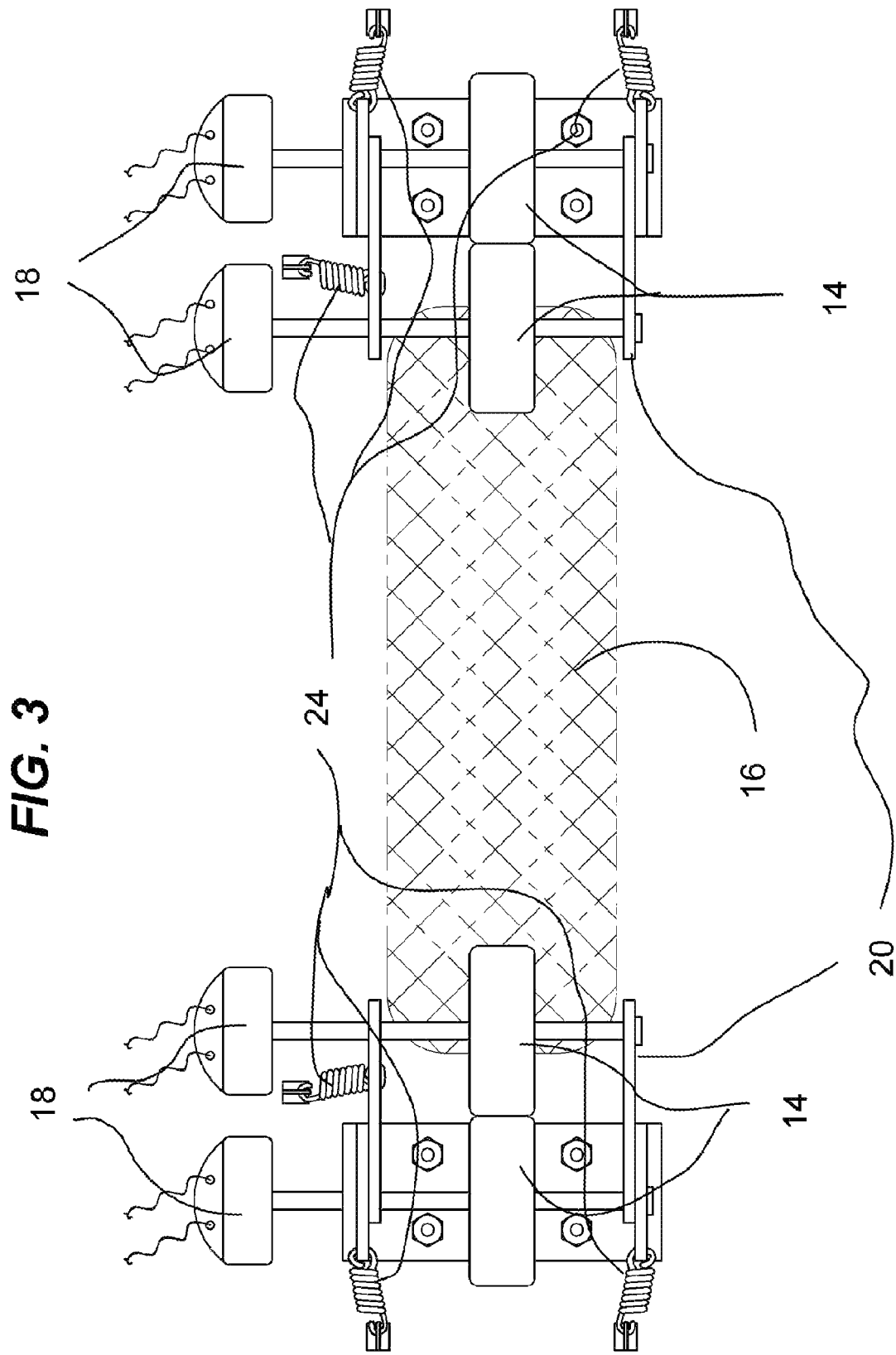

A tire actuated generator (10) for use on a tire (16) located on a car (12), preferably tires (16) that are not directional, such as the rear as opposed to the front tires (16) of a car (12).

The tire actuated generator (10) has a pair of wheels (14) making contact with the rear tire (16). One of the wheels (14) is at the leading side, and one of the wheels (14) is at the trailing side. Each of those wheels (14) is directly connected to a generator (18) but is also frictionally coupled to yet another wheel (14) which is itself connected to yet another generator (18). A bracket (20) connects the wheels (14) to the car's frame (22).

A spring (24) keeps pressure on the wheels (14) so that they always make contact with the tire (16) as it moves up and down by movement of the suspension.

The generators (18) are connected to batteries (not shown) as is known in the art.

As long as the car (12) is moving and the tires (16) are turning, electricity is being generated.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A tire actuated generator comprising two sets of wheels, one set adapted to be frictionally connected to a leading portion of a rotatable tire, and the second set adapted to be frictionally connected to a trailing portion of said rotatable tire; each of said two sets of wheels including two wheel members, wherein a first wheel member is adapted to frictionally connect with said rotatable tire, and a second wheel member mechanically and frictionally connected with said first wheel member, and is axially connected to a frame bracket member that is adapted to be removably coupled to a frame member that is adapted to rotatably hold said rotatable tire; and a plurality of generator members wherein each generator member is axially and rotatably connected to a respective wheel member and is adapted to convert the rotational motion of said rotatable tire into electrical energy.

2. The tire actuated generator of claim 1, wherein axial connections between the wheel members and the generator members are formed by axel members extending from and through each said wheel member.

3. The tire actuated generator of claim 2, wherein each of said second wheel members is mechanically connected with each of said first wheel members by respective pairs of axel bracket members that rotatably hold respective portions of each of said axel members of said first and second wheel members.

4. The tire actuated generator of claim 3, further including spring members adapted to be connected between said axel bracket members and said frame member, such that a chosen spring tension of said spring members produces a desired amount of pressure and friction between respective first wheel members and said rotatable tire.

5. The tire actuated generator of claim 4, further including spring members adapted to be connected between said frame bracket members and said frame member.

6. A tire actuated generator system comprising a rotatable tire rotatably held by a frame member; and a generator mechanism comprising two sets of wheels, one set being frictionally connected to a leading portion of a rotatable tire, and the second set being frictionally connected to a trailing portion of said rotatable tire; each of said two sets of wheels including two wheel members, wherein a first wheel member is frictionally connected with said rotatable tire, and a second wheel member mechanically and frictionally connected with said first wheel member, and is axially connected to a frame bracket member that is adapted to be removably coupled to said frame member of said rotatable tire; and a plurality of generator members wherein each generator member is axially and rotatably connected to a respective wheel member and is adapted to convert the rotational motion of said rotatable tire into electrical energy, such that when said rotatable tire is rotated electrical current is generated by said generator members and can be used to run electrical items connected thereto.

7. The tire actuated generator system of claim 6, wherein axial connections between the wheel members and the generator members are formed by axel members extending from and through each said wheel member.

8. The tire actuated generator system of claim 7, wherein each of said second wheel members is mechanically connected with each of said first wheel members by respective pairs of axel bracket members that rotatably hold respective portions of each of said axel members of said first and second wheel members.

9. The tire actuated generator system of claim 8, further including spring members connected between said axel bracket members and said frame member, such that a chosen spring tension of said spring members produces a desired amount of pressure and friction between respective first wheel members and said rotatable tire.

10. The tire actuated generator system of claim 9, further including spring members connected between said frame bracket members and said frame member.

11. A motorized vehicle and tire actuated generator system, comprising a rotatable tire rotatably held by a frame member of a motorized vehicle; and a generator mechanism comprising two sets of wheels, one set being frictionally connected to a leading portion of a rotatable tire, and the second set being frictionally connected to a trailing portion of said rotatable tire; each of said two sets of wheels including two wheel members, wherein a first wheel member is frictionally connected with said rotatable tire, and a second wheel member mechanically and frictionally connected with said first wheel member, and is axially connected to a frame bracket member that is adapted to be removably coupled to said frame member of said rotatable tire; and a plurality of generator members wherein each generator member is axially and rotatably connected to a respective wheel member and is adapted to convert the rotational motion of said rotatable tire into electrical energy, such that when said motorized vehicle is driven along a roadway, said rotatable tire is rotated and electrical current is generated by said generator members and can be used to run electrical items of said motorized vehicle.

12. The motorized vehicle and tire actuated generator system of claim 11, wherein axial connections between the wheel members and the generator members are formed by axel members extending from and through each said wheel member.

13. The motorized vehicle and tire actuated generator system of claim 12, wherein each of said second wheel members is mechanically connected with each of said first wheel members by respective pairs of axel bracket members that rotatably hold respective portions of each of said axel members of said first and second wheel members.

14. The motorized vehicle and tire actuated generator system of claim 13, further including spring members connected between said axel bracket members and said frame member, such that a chosen spring tension of said spring members produces a desired amount of pressure and friction between respective first wheel members and said rotatable tire.

15. The motorized vehicle and tire actuated generator system of claim 14, further including spring members connected between said frame bracket members and said frame member.

* * * * *